US010695936B2

(12) United States Patent
Herman (10) Patent No.: US 10,695,936 B2
(45) Date of Patent: Jun. 30, 2020

(54) BREAD CUTTING MACHINE (71) Applicant: Freek Arie Herman, Leek (NL)

(72) Inventor: Freek Arie Herman, Leek (NL)

(*) Notice: Subject to any disclaimer, the term of this patent is extended or adjusted under 35 U.S.C. 154(b) by 0 days.

(21) Appl. No.: 16/051,246

(22) Filed: Jul. 31, 2018

(65) Prior Publication Data

US 2019/0105795 A1  Apr. 11, 2019

(30) Foreign Application Priority Data

Oct. 9, 2017 (NL) .................................... 2019688

(51) Int. Cl.
| B26D 7/32 | (2006.01) |
| B65B 25/18 | (2006.01) |
| B26D 1/00 | (2006.01) |
| B26D 7/06 | (2006.01) |
| A47J 47/00 | (2006.01) |
| B26D 1/11 | (2006.01) |
| B26D 1/553 | (2006.01) |

(52) U.S. Cl.
CPC ............... B26D 7/325 (2013.01); B26D 1/00 (2013.01); B26D 7/0616 (2013.01); B26D 7/0683 (2013.01); B65B 25/18 (2013.01); A47J 47/00 (2013.01); B26D 1/11 (2013.01); B26D 1/553 (2013.01); B26D 2007/327 (2013.01); B26D 2210/06 (2013.01)

(58) Field of Classification Search
CPC ...... B26D 2210/06; B26D 7/325; B26D 1/01; B26D 1/553; B26D 1/00; Y10T 83/654
See application file for complete search history.

(56) References Cited

U.S. PATENT DOCUMENTS

| 717,223 | A | * | 12/1902 | Leachman | ............. | B26D 1/553 |
| | | | | | | 83/468.1 |
| 3,605,839 | A | * | 9/1971 | Gerson | .................. | B26D 1/553 |
| | | | | | | 83/425.3 |

(Continued)

FOREIGN PATENT DOCUMENTS

| EP | 1574304 | 9/2005 |
| EP | 2556932 | 2/2013 |
| NL | 2015186 | 2/2017 |

OTHER PUBLICATIONS

Netherlands Search Report issued in application No. 2019688, dated Sep. 10, 2018 (7 pgs).

Primary Examiner — Andrea L Wellington
Assistant Examiner — Fernando A Ayala
(74) Attorney, Agent, or Firm — Hayes Soloway P.C.

(57) ABSTRACT

A bread cutting machine for bread has a receiving surface for receiving the bread to be cut, wherein the receiving surface has a first edge and an opposite second edge, and defines a receiving plane; a cutting device with an array of cutting blades placed at or near the first edge of the receiving surface, wherein the array of cutting blades defines a first plane; and a pushing device configured for pushing the bread to be cut along the receiving surface in a pushing direction extending between the first and second edges of the receiving surface, towards and/or beyond the cutting device. The pushing device includes a push surface for contacting the bread to be cut during pushing thereof. The push surface and/or the first plane are at an acute angle with respect to the pushing direction.

21 Claims, 4 Drawing Sheets

(56) References Cited

U.S. PATENT DOCUMENTS

| | | | | |
|---|---|---|---|---|
| 3,656,524 | A | * | 4/1972 | Giangiulio ............... A47J 45/02 269/289 R |
| 4,137,807 | A | * | 2/1979 | Schaumberg .......... B26D 3/185 83/564 |
| 4,254,678 | A | * | 3/1981 | Steiner ..................... B26D 7/22 83/425.3 |
| 4,567,801 | A | * | 2/1986 | Jones ....................... B26D 1/03 83/404.3 |
| 4,599,928 | A | * | 7/1986 | Oker ...................... B26D 1/553 83/581.1 |
| 6,237,457 | B1 | * | 5/2001 | Taylor .................... B23D 47/02 411/544 |
| 6,558,244 | B1 | * | 5/2003 | Nedelka ............... A22C 25/185 452/149 |
| 7,984,554 | B2 | * | 7/2011 | Aby-Eva ................. A47J 9/003 30/116 |
| 9,511,504 | B2 | * | 12/2016 | Whitney ................. B26D 5/16 |
| 2006/0225547 | A1 | * | 10/2006 | Stanojevic ............. B26D 1/553 83/13 |
| 2017/0113371 | A1 | * | 4/2017 | Van Cauwenberghe ..................... B26D 1/553 |

* cited by examiner

BREAD CUTTING MACHINE

BACKGROUND

The invention relates to a bread cutting machine for cutting bread, in particular a baguette, into slices. The invention further relates to a pushing device for use in such a bread cutting machine.

A bread cutting machine as such is known. The known bread cutting machine comprises a receiving surface for receiving the bread to be cut, a cutting device placed at an edge of the receiving surface for cutting the bread into slices, and a pushing device configured for pushing the bread to be cut along the receiving surface towards and beyond the cutting device.

During use, a bread is inserted into the bread cutting machine. Upon activation of the bread cutting machine, the bread is pushed towards the cutting device and is cut into slices by the cutting device when it reaches the cutting device.

SUMMARY OF THE INVENTION

In case it is desired to pack the bread slices in a loose and random arrangement, the bread slices need to be loosened and transported from the bread cutting machine into a packaging bag. A bread cutting machine can comprise a funnel-shaped outlet for loosening and transporting the bread slices from the bread cutting machine into the packaging bag.

A disadvantage of the funnel-shaped outlet is that it becomes obstructed due to the bread slices passing there through simultaneously and, therefore, no bread slice exits the bread cutting machine.

It is an object of the present invention to ameliorate or to eliminate one or more disadvantages of the prior art, or to at least provide an alternative bread cutting machine.

According to a first aspect, the invention provides a bread cutting machine for cutting bread, in particular a baguette, into slices, wherein the cutting device comprises:

a receiving surface for receiving the bread to be cut, wherein the receiving surface has a first edge and a second edge opposite to the first edge, and defines a receiving plane;

a cutting device with an array of cutting blades placed at or near the first edge of the receiving surface, wherein the array of cutting blades defines a first plane; and a pushing device configured for pushing the bread to be cut along the receiving surface in a pushing direction extending between the first and second edges of the receiving surface, towards and/or beyond the cutting device, wherein the pushing device comprises a push surface for contacting the bread to be cut during pushing thereof, wherein the push surface and/or the first plane are at an acute angle with respect to the pushing direction at least as viewed in a direction substantially perpendicular to the receiving plane.

By placing the push surface or the first plane at the acute angle with respect to the pushing direction at least as viewed in the direction substantially parallel to the receiving plane, the longitudinal axis of the bread to be cut, such as a baguette to be cut, is at an acute angle to the first plane during cutting of the baguette. Due to the orientation of the baguette with respect to the first plane, the cutting blades of the array of cutting blades come into contact with the bread sequentially. The baguette slices, therefore, are loosened substantially sequentially from the baguette. After cutting the slice of baguette, the slice is caused to exit the bread cutting machine via an outlet, such as a funnel-shaped outlet. As a result, the slices leave the bread cutting machine substantially one-by-one, or in small groups of slices. It is thereby prevented that the outlet of the bread cutting machine, in particular the funnel-shaped outlet, becomes obstructed by the baguette slices.

Additionally, due to the orientation of the baguette with respect to the first plane, the slices are cut oblique with respect to the longitudinal axis of the baguette.

It is noted that in the context of the present application, an acute angle has to be understood as an angle larger than 0 degrees and smaller than 90 degrees. Further, the first plane has to be understood as a plane extending through substantially all cutting blades of the array of cutting blades.

In an embodiment, the push surface is at an acute angle to the pushing direction and the first plane is substantially perpendicular to the pushing direction at least as viewed in the direction perpendicular to the receiving plane. An advantage of this embodiment is that the cutting device can be constructed relatively simple with all cutting blades arranged adjacent and parallel to each other, or that a known cutting device can be used in the bread cutting machine according to this embodiment.

In an embodiment, the receiving plane and the push surface are at least partially substantially perpendicular and/or at an acute angle to each other. By placing the receiving plane and the push surface at the acute angle to one another, the baguette can be forced at least partially towards the receiving surface and can be prevented from moving upwards for example during cutting thereof.

In an embodiment, the pushing device comprises a pushing member having a pushing body, wherein the pushing body defines the push surface. In a further embodiment, the pushing body is provided with a plurality of slits provided at the side of the pushing body that faces the cutting device, which slits are orientated substantially parallel to each other and/or to the pushing direction of the pushing device, wherein the plurality of slits defines a plurality of pushing fingers. During use, the baguette has to be pushed beyond the cutting device in order to be cut into slices completely. Due to the slits in the pushing body, the pushing body is enabled to receive the cutting blades of the array of cutting blades. The pushing body, therefore, can keep pushing the baguette beyond the cutting device and thus until the baguette is cut into slices completely.

In an embodiment, the receiving surface has a third edge and a fourth edge opposite to the third edge, wherein each of the pushing fingers has a length in the pushing direction, wherein the length of the pushing fingers decreases in a direction from the third edge to the fourth edge, wherein a distance between the push surface and the first plane is smaller at the third edge than at the fourth edge.

In an embodiment, each of the pushing fingers has a contact part for contacting the bread to be cut, wherein the contact part of each of the pushing fingers is faced towards the cutting device, preferably wherein the contact parts of the pushing fingers together define the push surface. In a further embodiment, each of the contact parts is at an acute angle with respect to the receiving surface. Preferably the acute angle between the contact parts of the pushing fingers and the receiving plane increases in the direction from the third edge to the fourth edge. Due to the increasing acute angle between the contact parts of the pushing fingers and the receiving plane, the baguette can be kept in place/orientation during the entire process of cutting the baguette.

In an embodiment, the pushing device is provided with one or more retaining members, which one or more retaining members extend towards the cutting device. In a further embodiment, each of the one or more retaining members comprises a first part and a second part, wherein the first part is connected to the pushing device, and the second part is connected to the first part at the end of the first part facing the cutting device. Preferably the first part is orientated substantially parallel to the receiving surface, and the second part is placed at an obtuse angle with respect to the first part. Preferably a distance between each of the ends of the first parts facing the cutting device and the push surface is substantially equal for a majority of the one or more retaining members. An advantage of the retaining members is that the baguette can be kept in substantially the same orientation with respect to the first plane during cutting of the baguette, as the baguette can be retained between the retaining members and the pushing device, in particular the pushing body thereof.

It is noted that in the context of the present patent application, an obtuse angle has to be understood as an angle larger than 90 degrees and smaller than 180 degrees.

In an embodiment, the receiving surface has one or more guiding grooves extending between the first edge and the second edge and substantially parallel to each other. In a further embodiment, the one or more guiding grooves are configured for guiding the one or more retaining members, in particular the first parts thereof. During pushing of the baguette, the retaining members are kept in the guiding grooves which extend substantially parallel to the pushing direction. The retaining members, therefore, are prevented from moving in an undesired direction and the baguette can be retained in the desired position/orientation.

In an embodiment, the receiving plane and the first plane are substantially perpendicular or at an acute angle to each other. By providing the receiving plane and the first plane in the acute angle to each other, the baguette is at least partially enclosed by the array of cutting blades and the receiving surface during cutting of the baguette. The baguette is therewith prevented from moving due to the movement of the cutting blades which are cutting the baguette. This is advantageous, as the baguette can be kept in place.

In an embodiment, the receiving surface has a plurality of slits extending substantially parallel to each other and/or to the pushing direction, wherein each of the plurality of slits is configured for receiving a cutting blade of the array of cutting blades. An advantage of this embodiment is that, during cutting, the bread slices are still supported by the receiving surface. This results in a better cut of the bread.

In an embodiment, the bread cutting machine comprises a driving mechanism operatively coupled with the cutting device and/or the pushing device, wherein the driving mechanism is configured for driving the cutting device and/or the pushing device.

According to a second aspect, the invention provides a method for cutting bread slices from a bread, in particular a baguette, preferably by means of a bread cutting machine as described above, wherein the method comprises the steps of:
  inserting a bread to be cut into the bread cutting machine, wherein the bread has a longitudinal axis,
  at the receiving surface, receiving the inserted bread to be cut,
  pushing the inserted bread to be cut in a pushing direction towards and/or beyond the cutting device by means of the pushing device, and
  cutting the bread into slices by means of the cutting device,
  wherein the cutting device comprises an array of cutting blades which are arranged adjacent to each other in a first plane, and wherein the longitudinal axis of the bread is at an acute angle with respect to the pushing direction.

In an embodiment the method further comprises the step of packing the bread slices into a packaging material, in particular a packaging bag.

In an embodiment the angle between the longitudinal axis of the bread and the pushing direction is between 5-25 degrees, in particular between 7-15 degrees, more particular is about 10 or 11 degrees.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF THE INVENTION

Figure 1:
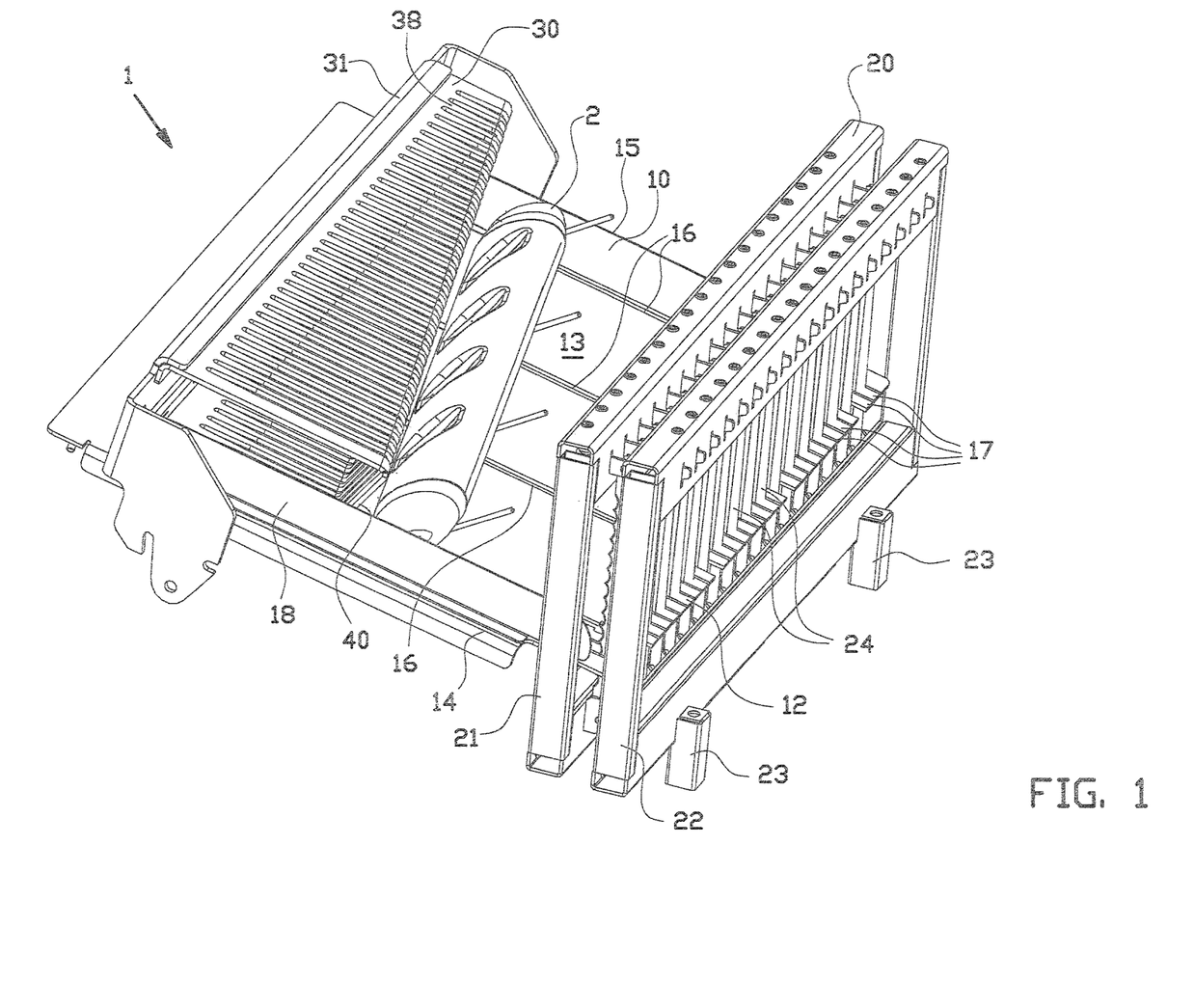
FIG. 1 shows an isometric view of a part of a cutting machine for cutting bread according to an embodiment of the invention, comprising a cutting device.
Figure 2:
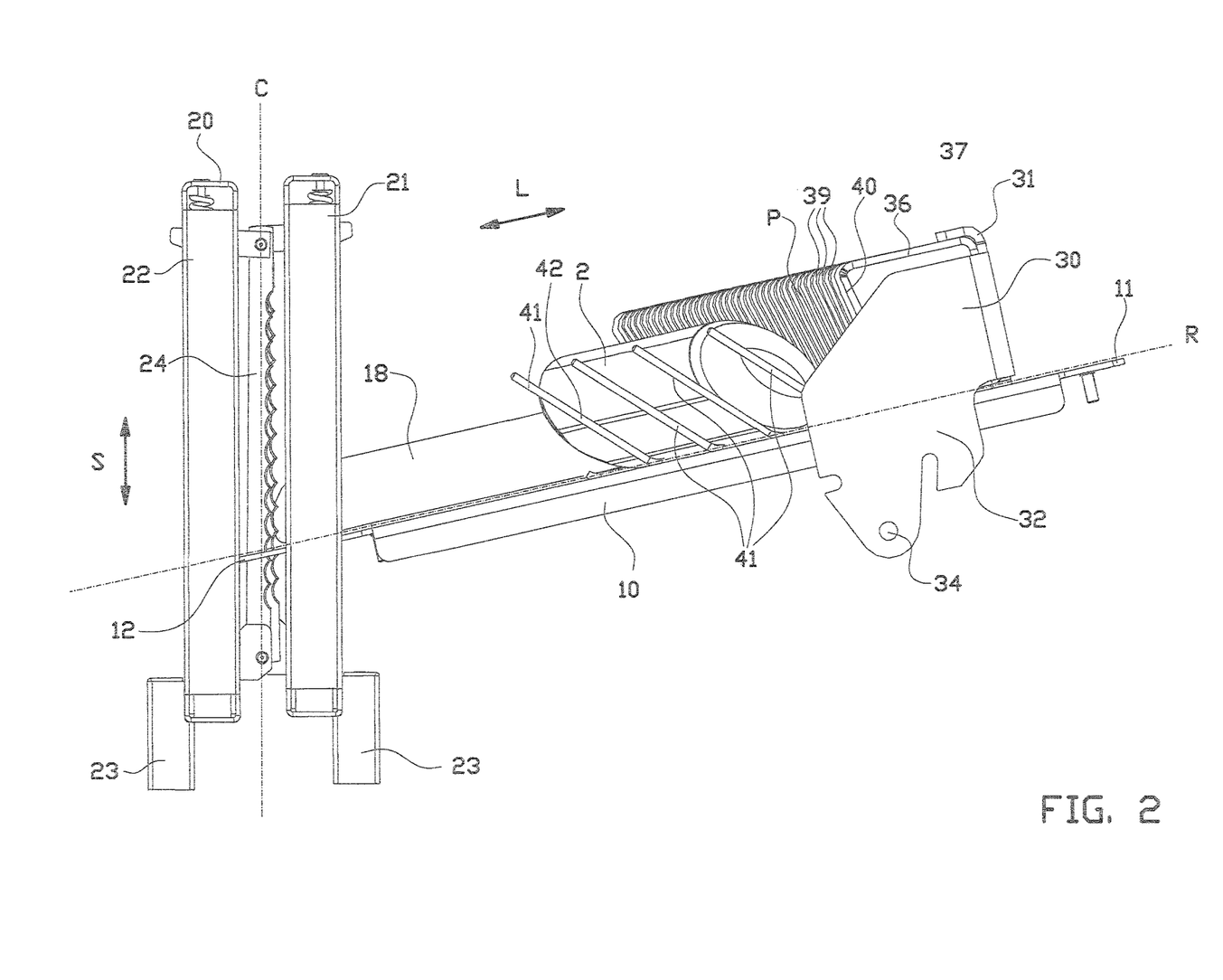
FIG. 2 shows a side view of the cutting machine from FIG. 1.
Figure 3:
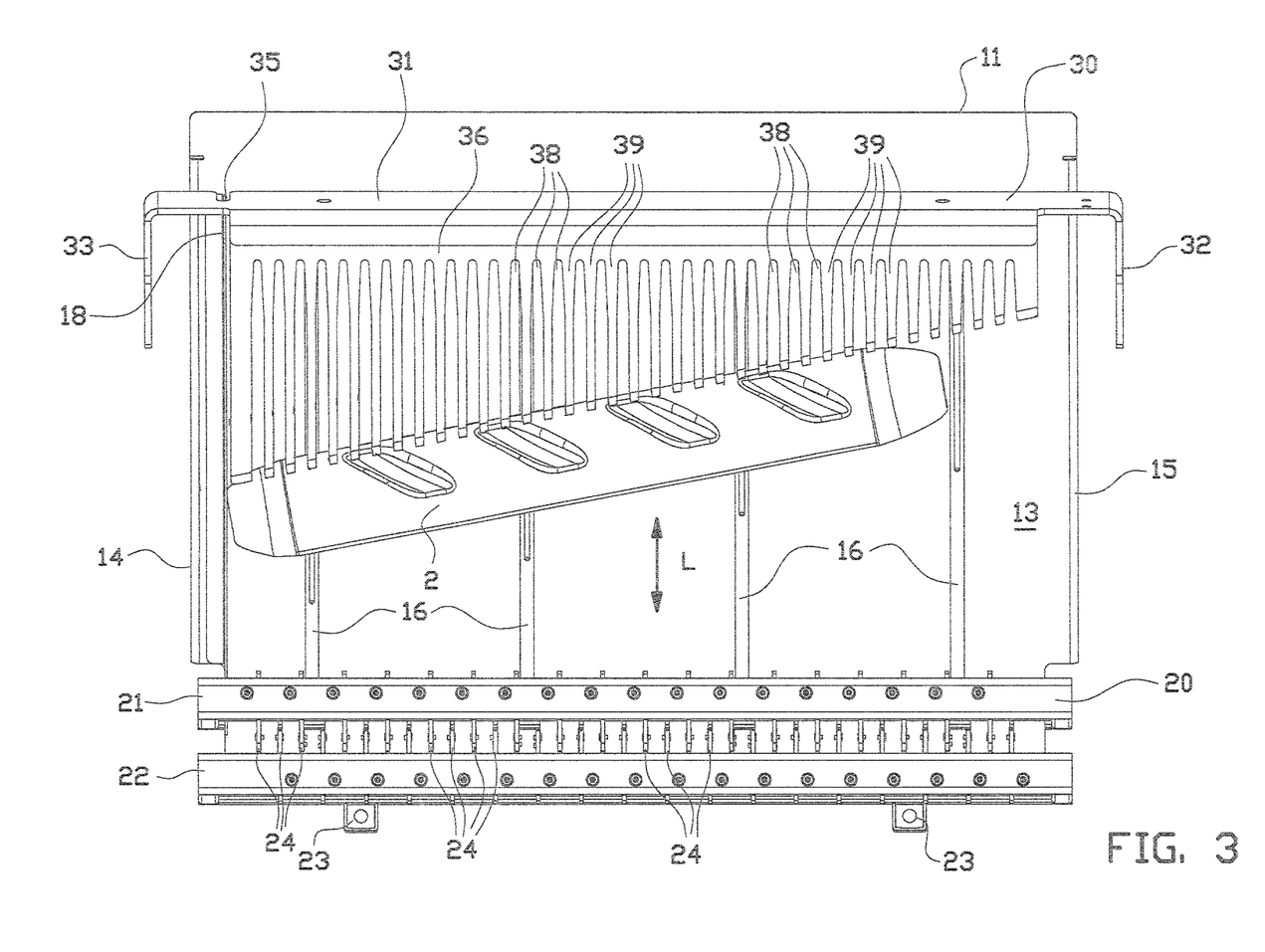
FIG. 3 shows a top view of the cutting machine from FIG. 1.

A cutting machine 1 for cutting baguettes according to an embodiment of the invention is partially shown in FIGS. 1 to 3. The cutting machine 1 comprises a housing with an inlet (not shown) via which a baguette to be cut is inputted into the cutting machine 1. The cutting machine 1 comprises a receiving surface 10 by which the inserted baguette 2 is received. The receiving surface 10 has a first edge 11 and a second edge 12 opposite to the first edge 11. A cutting device 20 for cutting the baguette into a plurality of slices is provided at the second edge 12 of the receiving surface 10. The cutting machine 1 further comprises a pushing device 30 for pushing the baguette 2 to be cut along the receiving surface 10 in a pushing direction L extending between the first and second edges 11, 12 of the receiving surface 10, towards and beyond the cutting device 20. When the baguette 2 has been cut into the plurality of slices by means of the cutting device 20, the baguette slices, for example, fall into a funnel (not shown) which leads the baguette slices to a packaging bag (not shown). Upon completion of cutting the baguette 2 or when the packaging bag is completely filled, the packaging bag can be removed from the cutting machine 1.

The receiving surface 10 comprises a substantially flat receiving body 13 with a third edge 14 and a fourth edge 15 opposite to the third edge 14. A receiving plane R is defined by the flat receiving body 13. The receiving body 13 is provided with a number of grooves 16 which are extending from the second edge 12 towards the first edge 11 of the receiving body 13 and substantially parallel to the pushing direction L and to the third and fourth edges 14, 15. At the second edge 12, the receiving body 13 comprises a plurality of slits 17 also extending from the second edge 12 towards the first edge 11 of the receiving body 13 and substantially parallel to the pushing direction L. A guiding strip 18 is provided at the top surface of the receiving body 13, wherein the guiding strip 18 is attached near the third edge 14 of the receiving body 13 and extends between the first edge 11 and the second edge 12. The baguette 2 to be cut is placed against and guided by the guiding strip 18 during use.

Figure 4:
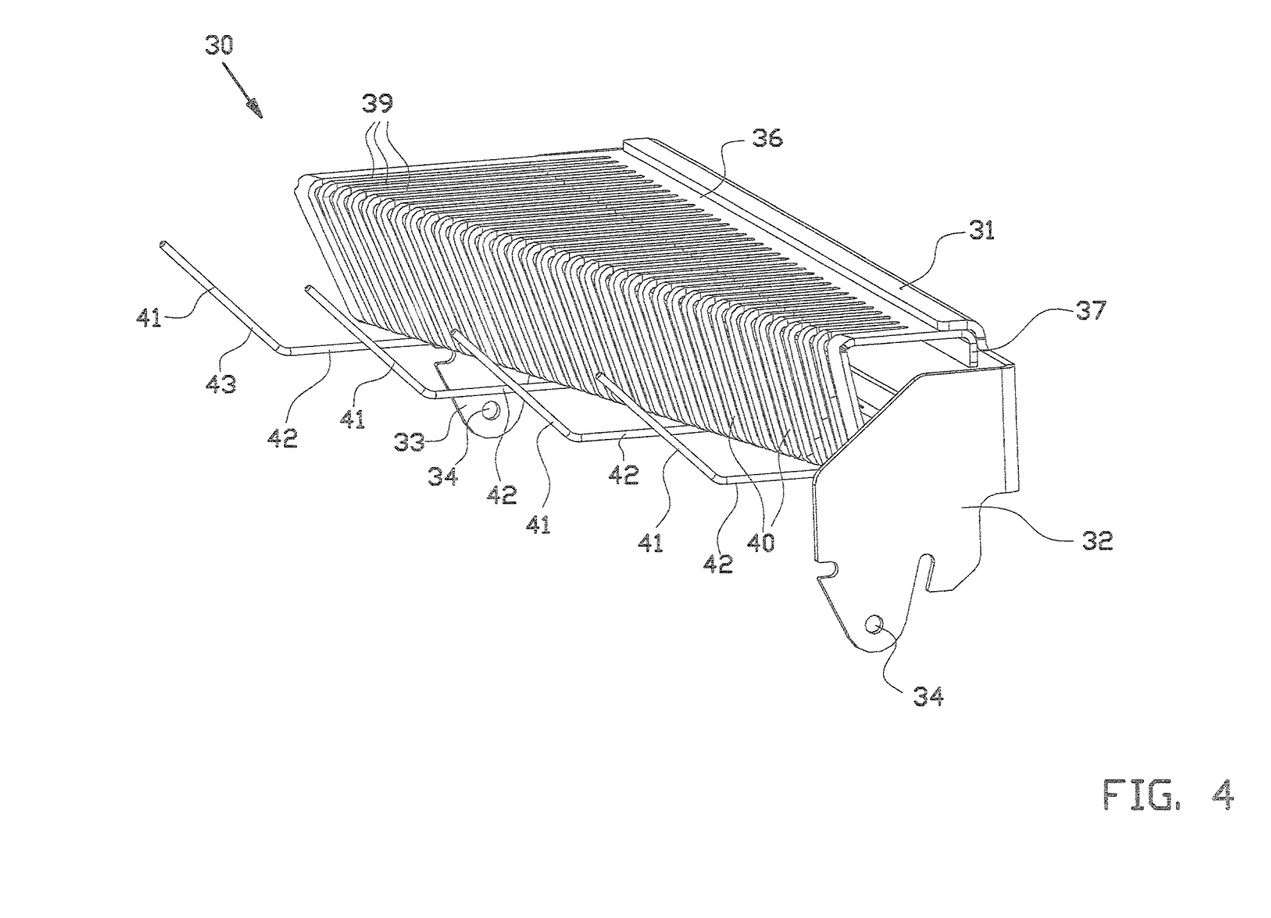
FIG. 4 shows an isometric view of the cutting device of FIG. 1.

The cutting device 20 comprises among others a first frame part 21 and a second frame part 22, which first and second frame parts 21, 22 are placed parallel to each other. Each of the first and second frame parts 21, 22 comprises securing members 23 in order to secure the cutting device 20 to the cutting machine 1. The cutting device 20 further comprises an array of cutting blades 24 which are provided between the first frame part 21 and the second frame part 22 and which are movable connected to the first and second frame parts 21, 22. The cutting blades 24 are movable in a cutting direction S and the array of cutting blades 24 defines a first plane C. Each of the cutting blades 24 is made of a thin elongated metal plate or strip with a cutting edge facing the pushing device 30, wherein each thin elongated metal plate or strip is substantially perpendicular to the first plane C. During use, the cutting blades 24 can be driven by means of a driving mechanism (not shown). As shown in FIG. 1, the cutting device 20 is provided at the second edge 12 of the receiving surface 10, wherein the cutting blades 24 are received by the slits 17. The cutting device 20 and the operation thereof as such are known and no further clarification of the cutting device 20 is considered necessary.

The pushing device 30 comprises a base part 31 which is placed above the top surface of the receiving surface 10. As shown in FIG. 3 the base part 31 extends over the complete width of the receiving surface 10. The base part 31 comprises a first coupling part 32 and a second coupling part 33, each provided with a coupling aperture 34. The pushing device 30, during use, is coupled to a driving mechanism (not shown) by means of the first coupling part 32 and the second coupling part 33, which might be the same driving mechanism as used for the cutting device 20. The driving mechanism drives the base part 31 and thus the baguette 2 towards the cutting device 20 along the pushing direction L when activated. As shown in FIG. 3 the base part 31 has a guide hole 35 which is configured for receiving the guiding strip 18 attached to the receiving surface 10.

As shown in FIGS. 1-3 the pushing device 30 further comprises a pushing member 36 defining a push surface P. The pushing member 36 has a hollow pushing body 37 which is provided with a number of slits 38, thereby defining a number of pushing fingers 39. The slits 38 are configured for receiving the cutting blades 24 of the cutting device 20 when the pushing device 30 pushes the baguette 2 beyond the cutting device 20. Each of the pushing fingers 39 has a contact part 40 which is in contact with the baguette 2 during pushing thereof. As shown in FIG. 3, each of the pushing fingers 39 has a length in the pushing direction L. As best shown in FIG. 3, the length of the pushing fingers 39 gradually decreases in a direction from the third edge 14 to the fourth edge 15. The push surface P defined by the pushing fingers 39, therefore, is at an acute angle with respect to the pushing direction L and at least as viewed in a direction substantially perpendicular to the receiving surface 10.

The angle between the push surface P and the pushing direction L can be between 5-25 degrees, in particular between 7-15 degrees, more particular can be about 10 or 11 degrees.

As shown in FIG. 2, the contact part 40 of each of the pushing fingers 39 is at an acute angle with respect to the receiving plane R defined by the receiving surface 10. The acute angle between the front parts 40 of the pushing fingers 39 and the receiving plane R gradually increases in a direction from the third edge 14 to the fourth edge 15. The baguette 2, therefore, becomes partially placed between the receiving surface 10 and at least a part of the pushing fingers 39 at least when being pushed, as shown in FIG. 3.

As shown in FIGS. 2 and 4, the pushing device 3 further comprises retaining members 41 which are secured to the hollow pushing body 37 and are extending from the hollow pushing body 37 towards the cutting device 20. Each of the retaining members 41 comprises a first part 42, which is configured to be received by one of the grooves 16 in the receiving body 13 and to be movable through the grooves 16. At the end of the first part 42 facing away from the hollow pushing body 37, a second part 43 is attached to the first part 42. As can be seen in FIGS. 2 and 4, the second part 43 is placed at an obtuse angle with respect to the first part 42 and to the receiving plane 3. The retaining members 41 define a retaining space for retaining the baguette 2 to be cut.

During use, the baguette 2 is inserted into the cutting machine 1 via the inlet in the housing and is guided towards the receiving surface 10. When the baguette 2 is received at the receiving surface 10, the baguette 2 is retained by the retaining members 41. Subsequently, the cutting device 20 and the pushing device 30 can be activated, such that the baguette 2 is pushed towards the cutting device 20. Upon reaching the cutting device 20, the baguette 2 is cut into multiple slices by pushing the baguette 2 beyond the cutting device 20.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary, the invention relates to a bread cutting machine for bread. The cutting device comprises: a receiving surface for receiving the bread to be cut, wherein said receiving surface has a first edge and an opposite second edge, and defines a receiving plane; a cutting device with an array of cutting blades placed at or near the first edge of the receiving surface, wherein said array of cutting blades defines a first plane; and a pushing device configured for pushing the bread to be cut along the receiving surface in a pushing direction extending between the first and second edges of the receiving surface, towards and/or beyond the cutting device. The pushing device comprises a push surface for contacting the bread to be cut during pushing thereof. The push surface and/or the first plane are at an acute angle with respect to the pushing direction.

The invention claimed is:

1. A bread cutting machine for cutting bread, in particular a baguette, into slices, wherein the cutting device comprises:
   a receiving surface for receiving the bread to be cut, wherein the receiving surface has a first edge and a second edge opposite to the first edge, and defines a receiving plane;
   a cutting device with an array of cutting blades placed at or near the second edge of the receiving surface, wherein the array of cutting blades defines a first plane; and
   a pushing device configured for pushing the bread to be cut along the receiving surface in a pushing direction extending between the first and second edges of the receiving surface, towards and/or beyond the cutting device, wherein the pushing device comprises a push surface for contacting the bread to be cut during pushing thereof, wherein the push surface is at an acute angle with respect to the pushing direction at least as viewed in a direction substantially perpendicular to the receiving plane, and is configured to maintain the received bread to be orientated with its longitudinal axis at an acute angle with respect to the first plane, such that the blades contact the bread in a sequential matter.

2. The bread cutting machine according to claim 1, wherein the push surface is at an acute angle to the pushing direction and the first plane is substantially perpendicular to the pushing direction at least as viewed in the direction substantially perpendicular to the receiving plane.

3. The bread cutting machine according to claim 1, wherein the receiving plane and the push surface are at least partially substantially perpendicular and/or at an acute angle to each other.

4. The bread cutting machine according to claim 1, wherein the pushing device comprises a pushing member having a pushing body, wherein the pushing body defines the push surface.

5. The bread cutting machine according to claim 4, wherein the pushing body is provided with a plurality of slits provided at the side of the pushing body that faces the cutting device, which slits are orientated substantially parallel to each other and/or to the pushing direction of the pushing device, wherein the plurality of slits defines a plurality of pushing fingers.

6. The bread cutting machine according to claim 5, wherein the receiving surface has a third edge and a fourth edge opposite to the third edge, wherein each of the pushing fingers has a length in the pushing direction, wherein the length of the pushing fingers decreases in a direction from the third edge to the fourth edge, wherein a distance between the push surface and the first plane is smaller at the third edge than at the fourth edge.

7. The bread cutting machine according to claim 5, wherein each of the pushing fingers has a contact part for contacting the bread to be cut, wherein the contact part of each of the pushing fingers is faced towards the cutting device, wherein the contact parts of the pushing fingers together define the push surface.

8. The bread cutting machine according to claim 7, wherein each of the contact parts is at an acute angle with respect to the receiving surface.

9. The bread cutting machine according to claim 8, the acute angle between the contact parts of the pushing fingers and the receiving plane increases in the direction from the third edge to the fourth edge.

10. The bread cutting machine according to claim 1, wherein the pushing device is provided with one or more retaining members, which one or more retaining members extend towards the cutting device.

11. The bread cuffing machine according to claim 10, wherein each of the one or more retaining members comprises a first part and a second part, wherein the first part is connected to the pushing device, and the second part is connected to the first part at the end of the first part facing the cutting device.

12. The bread cutting machine according to claim 11, wherein the first part is orientated substantially parallel to the receiving surface, and the second part is placed at an obtuse angle with respect to the first part.

13. The bread cutting machine according to claim 11, wherein, when the pushing device is provided with two or more retaining members, a distance between each of the ends of the first parts facing the cutting device and the push surface is substantially equal for a majority of the two or more retaining members.

14. The bread cutting machine according to claim 1, wherein the receiving surface has one or more guiding grooves extending between the first edge and the second edge and, when the receiving surface has more than one guiding groove, substantially parallel to each other.

15. The bread cutting machine according to claim 11, wherein the receiving surface has one or more guiding grooves extending between the first edge and the second edge and substantially parallel to each other, and wherein the one or more guiding grooves are configured for guiding the one or more retaining members, in particular the first parts thereof.

16. The bread cutting machine according to claim 1, wherein the receiving plane and the first plane are substantially perpendicular or at an acute angle to each other.

17. The bread cutting machine according to claim 1, wherein the receiving surface has a plurality of slits extending substantially parallel to each other and/or to the pushing direction, wherein each of the plurality of slits is configured for receiving a cutting blade of the array of cutting blades.

18. The bread cutting machine according to claim 1, further comprising a driving mechanism operatively coupled with the cutting device and/or the pushing device, wherein the driving mechanism is configured for driving the cutting device and/or the pushing device.

19. A method for cutting bread slices from a bread, in particular a baguette, comprising the steps of:
providing a bread cutting machine as claimed in claim 1,
inserting a bread to be cut into the bread cutting machine, wherein the bread has a longitudinal axis,
at the receiving surface, receiving the inserted bread to be cut,
pushing the inserted bread to be cut in a pushing direction towards and/or beyond the cutting device by means of the pushing device, and
cutting the bread into slices using the cutting device,
wherein the cutting device comprises an array of cutting blades which are arranged adjacent to each other in a first plane, and wherein the longitudinal axis of the bread is maintained at an acute angle with respect to the pushing direction and with respect to the first plane, such that the blades contact the bread in a sequential matter.

20. The method according to claim 19, further comprising the step of:
packing the bread slices into a packaging material.

21. The method according to claim 20, wherein the packaging material is a packaging bag.

* * * * *

UNITED STATES PATENT AND TRADEMARK OFFICE
CERTIFICATE OF CORRECTION

PATENT NO. : 10,695,936 B2  
APPLICATION NO. : 16/051246  
DATED : June 30, 2020  
INVENTOR(S) : Herman

Page 1 of 1

It is certified that error appears in the above-identified patent and that said Letters Patent is hereby corrected as shown below:

In the Claims

Claim 11, Column 7, Line 56, "bread cuffing machine" should be --bread cutting machine--.
Claim 19, Column 8, Line 53, "matter" should be --manner--.

Signed and Sealed this
Twenty-fourth Day of September, 2024

Katherine Kelly Vidal
*Director of the United States Patent and Trademark Office*